United States Patent [19]

Swihart et al.

[11] 4,447,499

[45] May 8, 1984

[54] METHOD OF COATING SUBSTRATES WITH POLYDIORGANOSILOXANES HAVING LOWER ALKYL SUBSTITUENTS TO PROVIDE RELEASE COATINGS

[75] Inventors: Terence J. Swihart, Essexville; Maris J. Ziemelis, Midland, both of Mich.

[73] Assignee: Dow Corning Corporation, Midland, Mich.

[21] Appl. No.: 493,122

[22] Filed: May 9, 1983

[51] Int. Cl.$^3$ .............................................. B05D 3/06
[52] U.S. Cl. ................................ 428/447; 204/159.13; 427/54.1; 428/452
[58] Field of Search .................... 427/44, 54.1, 208.4; 428/447, 448, 451, 452, 446; 204/159.13

[56] References Cited

U.S. PATENT DOCUMENTS

| 3,090,738 | 5/1963 | Warrick | 204/159.13 |
| 3,527,659 | 9/1970 | Keil | 428/452 |
| 3,726,710 | 4/1973 | Berger | |
| 4,052,529 | 10/1977 | Bokerman | |

FOREIGN PATENT DOCUMENTS 653301 12/1962 Canada .
1433461 2/1974 United Kingdom .

Primary Examiner—John H. Newsome
Attorney, Agent, or Firm—George A. Grindahl; Andrew H. Ward

[57] ABSTRACT

Adhesive-releasing silicone coatings are provided for substrates by applying a composition consisting essentially of a polydiorganosiloxane substituted with methyl, ethyl, propyl, or hydroxyl radicals and an ultraviolet radiation photosensitizer to a substrate, and exposing the applied solution to ultraviolet radiation. By the method of this invention said polydiorganosiloxanes can be crosslinked on substrates to furnish, e.g., adhesive-releasing coatings on paper.

29 Claims, No Drawings

METHOD OF COATING SUBSTRATES WITH POLYDIORGANOSILOXANES HAVING LOWER ALKYL SUBSTITUENTS TO PROVIDE RELEASE COATINGS

BACKGROUND OF THE INVENTION

The present invention relates to a method for coating a substrate with a silicone adhesive-releasing coating, and to the coated substrates obtained therefrom.

Silicone release coatings are well known. Films of cured polyorganosiloxanes provide easy release of a variety of adherent substances. One particularly well-known example of a silicone release coating is silicone-coated release paper. When laminated with pressure sensitive adhesive, (hereinafter also called PSA), silicone coated release paper provides protection for the PSA on, e.g., tapes and labels, and provides subsequent easy release of the coated release paper from the adhesive coating immediately prior to its intended final use, without significant loss of the adhering qualities of said PSA.

While heat-curing silicone coatings furnished as a solution in a volatile hydrocarbon solvent can provide acceptable silicone release coatings, environmental and efficiency considerations have motivated the development of solventless, silicone compositions. Because of the relative safety and low cost of UV radiation sources, methods of curing such solventless silicone compositions with UV radiation have been particularly sought.

Canadian Pat. No. 653,301, discloses an extremely broad class of silicones, other organosilicon polymers, and organosilicon compounds, that are curable by exposure to x-rays, energetic electrons, or UV radiation, with necessary exposure times ranging from a few minutes to several hours. However, exposure times even as short as one minute are unacceptably long for modern release coating application processes.

U.S. Pat. No. 3,726,710, discloses rapid UV radiation curing of silicones containing silicon-bonded vinyl radicals to provide release coatings. U.S. Pat. No. 4,052,529, discloses silicones containing silicon-bonded vinyl radicals and silicon-bonded mercaptoalkyl radicals, to provide UV radiation cured release coatings. British Pat. No. 1,433,461, discloses the UV radiation curing of silicones containing silicon-bonded vinyl radicals and silicon-bonded hydrogen radicals.

The last three patents mentioned above rely upon the use of silicones containing highly reactive substituents, such as vinyl radicals and mercaptoalkyl radicals, to provide rapid cure of a siloxane release coating by exposure to UV radiation.

None of the above references teach the present invention, wherein certain polydiorganosiloxanes without highly reactive substituents can be rapidly cured by exposure to UV radiation. The discovery of the method of the present invention provides economic advantages since the highly reactive substituents of the prior art add significantly to the cost of silicones containing said highly reactive substituents. In addition, the compositions of the method of the present invention generally have enhanced storage stability in comparison to the compositions of the prior art containing highly reactive substituents.

SUMMARY OF THE INVENTION

The present invention relates to a method comprising applying, to a substrate, a coating composition consisting essentially of, (1) a polydiorganosiloxane substituted with certain lower alkyl radicals and/or hydroxyl radicals and, (2) an ultraviolet (UV) radiation photosensitizer, then rapidly curing said applied coating composition by exposing it to ultraviolet (UV) radiation, thus providing an adhesive-releasing coating. The present invention further relates to coated release paper or polymeric film produced by practicing the method of the present invention with a paper or a polymeric film substrate.

It is an object of the present invention to provide a method for rapidly curing silicone release coatings by UV radiation. It is a further object of the present invention to provide a method for producing silicone release coatings from polydiorganosiloxanes free of highly reactive substituents. It is another object of the present invention to provide a method for producing a silicone release coating that is economical, and does not require the use of solvents. It is yet a further object of the present invention to provide a method for producing adhesive-releasing coatings on paper.

These objects, and other objects which will be apparent to those skilled in the art upon consideration of the following specification and claims, are accomplished by applying, to a substrate, a coating composition consisting essentially of certain polydimethylsiloxanes, further substituted with at least two radicals selected from ethyl, propyl, or hydroxyl radicals, and a UV radiation photosensitizer; and curing said applied coating composition by exposure to UV radiation.

It was not expected that polydiorganosiloxanes free of highly reactive substituents, and containing hydroxyl radicals, or certain lower alkyl radicals would cure rapidly when applied to a substrate and exposed to UV radiation.

Additionally, it has been found that certain polydimethylsiloxanes containing at least two radicals selected from ethyl, propyl, and hydroxyl radicals cure more rapidly when applied to a substrate and exposed to UV radiation if they further contain a vinyl-containing linear or cyclic polydiorganosiloxane.

DETAILED DESCRIPTION OF THE INVENTION

The present invention relates to a method for coating a substrate with a polydiorganosiloxane to provide a coating upon said substrate, said method comprising
(A) applying to said substrate a coating composition consisting essentially of
(1) 100 parts by weight of a polydiorganosiloxane having a viscosity of from about $1.0 \times 10^{-4}$ m$^2$/second to about $1.0 \times 10^{-2}$ m$^2$/second, said polydiorganosiloxane being selected from the group consisting of polydiorganosiloxanes having the formula R$_3$SiO(MeQSiO)$_x$(Me$_2$SiO)$_y$SiR$_3$, wherein Q is a radical selected from the group consisting of ethyl and propyl radicals, R is a radical selected from the group consisting of Q radicals, methyl radicals, and hydroxyl radicals, Me represents the methyl radical, x has an average value of 0 or more, and y has an average value of 0 or more, there being at least two radicals selected from Q radicals and hydroxyl radicals in the polydiorganosiloxane, and
(2) 0.1 to 10 parts by weight of an ultraviolet radiation photosensitizer soluble in said polydiorganosiloxane, and (B) exposing the applied coating composition to an amount of ultraviolet radiation sufficient to cure said applied coating composition.

This invention further relates to paper or polymeric film coated by the method of this invention.

Component (1) of the coating composition of the method of this invention, is a polydiorganosiloxane selected from the group consisting of polydiorganosiloxanes having the formula $R_3SiO(MeQSiO)_x(Me_2SiO)_ySiR_3$, wherein Me represents the methyl radical; Q is an ethyl radical or propyl radical; R is a methyl radical, Q radical, or hydroxyl radical; x has a value of 0 or more; y has a value of 0 or more; and the polydiorganosiloxane has at least two radicals selected from Q radicals and hydroxyl radicals.

The sum of the values of x and y is generally at least 40. The viscosity of the polydiorganosiloxane used as component (1) of the coating compositions of the present invention is from about $1.0 \times 10^{-4}$ m$^2$/second to about $1.0 \times 10^{-2}$ m$^2$/second at 25° C.

Examples of polydiorganosiloxanes which are suitable in the present method include those having the formula $HOMe_2SiO(Me_2SiO)_ySiMe_2OH$, such as $HOMe_2SiO(Me_2SiO)_{400}SiMe_2OH$; those having the formula $Me_3SiO(MeQSiO)_x(Me_2SiO)_ySiMe_3$, such as $Me_3SiO(MeEtSiO)_{350}SiMe_3$, and $Me_3SiO(MeEtSiO)_{50}(Me_2SiO)_{250}SiMe_3$; those having the formula $HOMeRSiO(MeQSiO)_x(Me_2SiO)_ySiMeROH$, such as $HOMe_2Si(MeEtSiO)_{10}(Me_2SiO)_{200}SiMe_2OH$, $HOMeEtSiO(MeEtSiO)_{300}SiMeEtOH$, $HOMePrSiO(MePrSiO)_{60}SiMePrOH$ and $HOMeEtSiO(MeEtSiO)_{200}(Me_2SiO)_{10}SiMeEtOH$; those having the formula $QMe_2SiO(MeQSiO)_x(Me_2SiO)_ySiMe_2Q$, such as $EtMe_2SiO(Me_2SiO)_{300}SiMe_2Et$ and $EtMe_2SiO(MePrSiO)_{50}(Me_2SiO)_{100}(MeEtSiO)_{10}SiMe_2Et$, and those having the formula $Q_3SiO(MeQSiO)_x(Me_2SiO)_ySiQ_3$, such as $Et_3SiO(Me_2SiO)_{300}SiEt_3$, $Et_3SiO(Me_2SiO)_{100}SiEt_3$, and $Et_3SiO(MePrSiO)_{150}SiEt_3$. Herein Et denotes the ethyl radical and Pr denotes the propyl radical. By propyl it is meant herein both isomeric forms of propyl radicals, i.e., normal propyl and isopropyl.

Hydroxy endblocked polydimethylsiloxanes having viscosities within the hereinabove recited viscosity range are well known and commercially available. Alternatively, said hydroxy endblocked polydimethylsiloxanes can be synthesized by a number of known methods. Exemplary of such methods are full or partial hydrolysis and subsequent condensation of dimethylsilanes having two silicon-bonded hydrolyzable radicals, such as alkoxy radicals, such as ethoxy or methoxy radicals; or such as halogen atom radicals, such as fluorine, chlorine, or bromine radicals. Viscosity of the resulting polydimethylsiloxane can be controlled by controlling the amount of water present in the condensation step in the well-known manner.

Said hydroxy endblocked polydimethylsiloxanes can also be synthesized by acidic or basic equilibration of cyclopolydimethylsiloxanes, followed by water washing and subsequent isolation of the resultant hydroxy endblocked polydimethylsiloxane. Viscosity of the hydroxy endblocked polydimethylsiloxane can be controlled by controlling the concentration of the acid or base in the well-known manner.

Basic equilibration is a preferred method to synthesize the hydroxy endblocked polydimethylsiloxane of the coating compositions of the method of the present invention.

Polydiorganosiloxanes having the formula $R_3SiO(MeQSiO)_x(Me_2SiO)_ySiR_3$, wherein Me, R, Q, x, and y are as hereinabove set forth, are also well known, and many are available commercially. Said polydiorganosiloxanes can be synthesized by several well-known procedures, such as the hydrolysis and subsequent condensation of appropriate amounts of appropriately selected diorganosilanes and triorganosilanes having silicon-bonded hydrolyzable groups as hereinabove set forth.

Another appropriate synthetic procedure is acidic or basic equilibration of appropriately selected cyclopolydiorganosiloxanes in co-reaction with triorganosiloxanes having silicon-bonded hydrolyzable groups as hereinabove set forth. Viscosity of the final polydiorganosiloxane can be controlled by controlling the amount of water and the amount of triorganosilane present during the condensation or equilibration in the well-known manner.

Small amounts of polymer chain branching, such as are incidental to commercial manufacture of polydiorganosiloxanes, are not thought to adversely affect the efficacy of the method of this invention. Two or more different polydiorganosiloxanes, as hereinabove described, can be used conjointly as component (1) of the coating composition of the method of this invention, provided the viscosity of such a mixture of two or more different polydiorganosiloxanes is within the viscosity limits hereinabove recited.

Component (2) of the coating composition of the method of this invention, is a UV radiation photosensitizer or photoinitiator. A UV radiation photosensitizer or photoinitiator is a member of a well-known class of chemicals that facilitate or enhance the UV radiation curing of UV radiation curable compositions. The term photosensitizer is used herein to encompass both terms, i.e., photosensitizer and photoinitiator.

The UV radiation photosensitizer of the coating composition used in the method of this invention must be soluble in polydiorganosiloxane component (1) within the concentration limits hereinabove set forth. By soluble it is meant herein that the UV radiation photosensitizer can be incorporated in component (1) at the appropriate concentration, and will form a stable, homogeneous composition. By homogeneous it is meant herein having only one phase by visual inspection. A stable, homogeneous coating composition of the method of this invention will not show visible signs of phase separation for a period of time at least one day in duration.

Examples of UV radiation photosensitizers suitable for incorporation into the coating composition of the method of this invention include, but are not limited to, benzophenone and certain derivatives of benzophenone such as 2,2'-diethoxybenzophenone, and 2,4-dihydroxybenzophenone; benzoin ethyl ether; and 2,2'-diacetoxyacetophenone. Many suitable UV radiation photosensitizers are available commercially.

Two or more suitable UV radiation photosensitizers can be used conjointly in the method of this invention.

The coating composition of the method of this invention is prepared by simply mixing appropriate amounts of components (1) and (2) together until a stable, homogeneous composition is formed.

The coating compositions of the method of this invention can contain non-essential components, such as solvents, colorants, rheology control additives and the like. Incorporation of said non-essential components into the coating compositions of the method of this invention is within the scope of this invention.

Solvents can be added to the coating compositions of the method of this invention for such purposes as for lowering the viscosity of the coating composition or for enhancing the spreading and/or wetting characteristics of a coating composition.

Solvents added to the coating composition should form a stable homogeneous composition as hereinabove described, with the coating composition. Such solvents are well-known, and include, but are not limited to, aliphatic hydrocarbons, such as pentane, hexane, heptane, octane and nonane; aromatic hydrocarbons, such as toluene, xylene and mesitylene; halogenated hydrocarbons, such as 1,1,1-trichloroethane, 1-chloro-2-fluoroethane, and dichloromethane; alcohols, such as normal butanol and isopropanol; ketones, such as methylethylketone, and methylisobutylketone; and heterocyclic nitrogen containing solvents, such as pyridine and acetylmorpholine.

The amount of solvent added to the coating composition of the method of this invention, if any, is not critical. For example, an amount of solvent sufficient to lower the viscosity of said coating composition can range from one or two parts to several hundred parts of solvent per 100 parts by weight of polydiorganosiloxane component (1).

It is strongly preferred that polydiorganosiloxane component (1) per se have a viscosity sufficiently low, such as less than $8.0 \times 10^{-3}$ m²/second, so that the addition of solvent is not necessary.

Vinyl-containing organosiloxanes can advantageously be added to the compositions of the method of the present invention. Although the addition of vinyl-containing organosiloxanes to hydrogen radical-containing polydiorganosiloxanes to provide a UV curable composition is known, the benefits of adding vinyl-containing organosiloxanes to the compositions of the method of the present invention were not expected. Said adding of vinyl-containing organosiloxanes to the compositions of the method of the present invention is thought at this time to diminish minimum necessary cure times in the practice of the method of the present invention.

Vinyl-containing organosiloxanes suitable as additives in the practice of the method of this invention include linear polydiorganosiloxanes containing silicon-bonded vinyl radicals, and cyclopolydiorganosiloxanes containing silicon-bonded vinyl radicals. Said vinyl-containing organosiloxanes can be incorporated as additives in amounts from 0.1 parts by weight to 250 parts by weight, based on 100 parts by weight of polydiorganosiloxane component (1).

Examples of linear polydiorganosiloxanes containing silicon-bonded vinyl radicals include, but are not limited to: linear polydiorganosiloxanes having silicon-bonded vinyl radicals as end groups, such as:

$Me_2ViSiO(Me_2SiO)_{80}SiMe_2Vi$;

$Me_2ViSiO(Me_2SiO)_{200}SiMe_2Vi$; and $Me_2ViSiO(Me_2SiO)_{300}SiMe_2Vi$;

wherein Me represents the methyl group and Vi represents the vinyl group; linear polydiorganosiloxanes having silicon-bonded vinyl radicals bonded to silicon atoms within the main siloxane chain, such as:

$Me_3SiO(MeViSiO)_4(Me_2SiO)_{94}SiMe_3$;

$Me_3SiO(MeViSiO)_{14}(Me_2SiO)_{135}SiMe_3$; or $Me_3SiO(MeViSiO)_{29}(Me_2SiO)_{200}SiMe_3$;

wherein Me represents the methyl group and Vi represents the vinyl group; and linear polydiorganosiloxanes having silicon-bonded vinyl groups both as end groups and bonded to silicon atoms within the main siloxane chain, such as:

$Me_2ViSiO(MeViSiO)_5(Me_2SiO)_{96}SiMe_2Vi$;

$Me_2ViSiO(MeViSiO)_1(Me_2SiO)_{200}SiMe_2Vi$; or $Me_2ViSiO(MeViSiO)_6(Me_2SiO)_{240}SiMe_2Vi$;

wherein Me represents the methyl group and Vi represents the vinyl group.

Examples of cyclopolydiorganosiloxanes containing silicon-bonded vinyl radicals include, but are not limited to: cyclopolydiorganosiloxanes in which the vinyl radicals are symmetrically distributed, such as:

$(MeViSiO)_3$;

$(MeViSiO)_4$; or $(MeViSiO)_5$;

wherein Me represents the methyl group and Vi represents the vinyl group; and cyclopolydiorganosiloxanes in which the vinyl radicals are not symmetrically distributed; such as:

$(MeViSiO)_1(Me_2SiO)_2$;

$(MeViSiO)_2(Me_2SiO)_2$;

$(MeViSiO)_3(Me_2SiO)_2$;

In the method of this invention, the coating composition is applied to, and cured with UV radiation upon, a suitable substrate. Examples of suitable substrates include, but are not limited to: cellulosic substrates, such as paper and wood; metal substrates, such as aluminum and steel; polymeric materials in film form, such as films of polyethylene, polypropylene, polyethylene terephthalate, polyamides and other polymeric films; polymeric films, as hereinabove recited, bonded to other substrates, such as paper or metal; and such substrates as glass, ceramic, concrete, and rock substrates. Release coatings produced by the method of this invention are particularly useful on paper substrates and polymeric film substrates.

In a first step of the method of the present invention, the coating composition is applied to a suitable substrate. Suitable specific methods of application include brushing, dipping, application by rollers, spraying, and electrostatic spraying. Application of the coating composition to a paper substrate can be accomplished by the use of such application equipment as trailing blade coaters, air knives, kiss rolls, gravure rolls, or printing equipment, such as offset presses.

While the thickness of the coating composition applied to the substrate is not narrowly critical, it is a general practice to apply relatively thin coatings. For example, from 0.1 g to 1.5 g of coating per square meter of paper substrate is typical for silicone coated release paper.

If a solvent has been added to the coating composition, it is desirable that said added solvent be substantially removed from the applied coating composition prior to exposure of said applied coating composition to UV radiation. Solvent removal can be accomplished by allowing the solvent to evaporate, either by exposing the coated substrate to ambient temperature and pressure for a period of time sufficient to substantially remove said added solvent, or by exposing the coated substrate to elevated temperature and/or decreased pressure, for a period of time sufficient to substantially remove said added solvent. Alternatively, each of the above methods of substantially removing said solvent can be used in succession.

In a second step of the method of the present invention, the applied coating composition is exposed to an amount of UV radiation sufficient to cure said composition. UV radiation, as referred to herein, means electromagnetic radiation having a spectral range, in wavelengths, of from 100 nm to 380 nm. Intensity of said UV radiation is expressed herein in units of kW/m (kilowatts per meter of lamp). It is preferred that the intensity of the UV radiation used to cure the coating composition in the method of this invention be greater than about 1.0 kW/m. Lamps capable of generating UV radiation of an intensity greater than 1.0 kW/m are well known and widely available. Exemplary of such lamps are high pressure mercury vapor lamps, medium pressure mercury vapor lamps, and low pressure mercury vapor lamps. Other sources of appropriate UV radiation will be apparent to those skilled the the art.

Cure, as used herein, is defined in terms of the results of certain performance tests hereinafter described.

The method of this invention provides excellent adhesive-releasing coatings. Surprisingly, this invention provides such coatings without relying upon components containing highly reactive and more expensive substituents.

The following examples are set forth to further illustrate the method of this invention. These examples are not to be construed as limiting the invention, the scope of which is set forth in the claims. All parts and percentages reported herein are by weight unless otherwise stated. Viscosities reported herein were measured in centistokes at 25° C. and converted to m²/second by multiplying by $1.00 \times 10^{-6}$ m²/second/centistokes and rounding the result of said multiplication to two significant figures. Me represents the methyl radical in the following examples, and Vi represents the vinyl radical.

Test Methods

The following test methods were used herein to evaluate the cure and the release properties of release coatings.

Ruboff and Smear

Ruboff and smear were evaluated by vigorously rubbing the coating to be evaluated with an index finger and observing the results of said rubbing. A properly cured coating shows no material visibly removed; this result is reported herein as "no ruboff". A properly cured coating also shows no material visibly displaced in the form of a streak or streaks; this result is reported herein as "no smear".

Migration

Migration was evaluated herein by adhering a section of Scotch ® tape, a product of the 3M Co. of St.Paul, MN, to the coating to be evaluated, removing said tape from the coating, and attempting to adhere the removed tape to itself by folding the adhesive-coated side of said tape inwardly upon itself, so that the interface created was an adhesive-to-adhesive interface. Migration was evident when the tape would not adhere to itself. A properly cured coating allows strong adherence of the tape to itself in the migration test.

Release

Release is quantified herein by the force per unit width necessary to peel a substrate, coated with a release coating, from an adhesive coated substrate. Values of release reported herein were determined by coating a solution of 30-6045 styrene-butadiene rubber (SBR) adhesive, a product of National Starch Co. of Bridgewater, NJ, upon a cured release coating. The solution of SBR adhesive was applied directly to the cured release coating, at a wet thickness of 76 m, using an appropriate drawdown bar. The applied adhesive solution was held at room temperature for one minute to allow some of the solvent in the adhesive solution to evaporate. The remaining solvent was substantially removed by heating the applied adhesive solution to a temperature of 65° C. for one minute, after which time the applied adhesive was allowed to cool to room temperature. A sheet of 60 pound matte litho paper was pressed onto the applied adhesive, thus forming a laminate. This laminate was forcefully bonded by being passed through the rolls of an offset printer, and then aged at a temperature of 70° C. for twenty hours.

Release values reported herein were obtained by measuring the force necessary to delaminate the above laminate, at the release coating/adhesive interface, at room temperature, at an angle of $\pi$ radians (180°), and at a delamination rate of 0.17 m/second (400 in/min). Said force was measured by grams per inch of width and converted to N/m by multiplying by 0.386 N/m per g/in and rounding the result of said multiplication off to two significant figures.

EXAMPLE 1

A coating composition consisting of 9.85 g, (100 parts) of hydroxy endblocked polyethylmethylsiloxane having a viscosity of $6.0 \times 10^{-3}$ m²/second, and 0.15 g (1.52 parts) of benzophenone was prepared by simple mixing, and was applied to 40 pound kraft paper supercalendered on both sides, a product of Weyerhauser, Tacoma, WA. The applied composition was wiped to a thin film with a paper towel. The kraft paper thus coated was cured by passing said coated kraft paper past a UV radiation source, at a speed of 152 mm/second, (30 ft/min), at a distance from said source of approximately 80 mm. Said source consisted of two medium pressure mercury vapor lamps, products of Conrad-Hanovia, Inc., Newwark, NJ, 0.51 m in length, having an intensity of 1.4 kW/m in the UV spectral range, and having a UV spectral maximum at a wavelength of 366 nm. The exposure time under these conditions was 3.3 seconds.

The resulting release coating showed no ruboff, no smear, and no migration.

EXAMPLE 2

The procedure of Example 1 was repeated with 4.2 parts of benzophenone. No ruboff, no smear, and no migration were noted upon evaluation of the cured film.

EXAMPLE 3

The procedure of Example 1 was repeated with 2 parts of benzoin ethyl ether in place of benzophenone. Surface cure was apparent in the cured film by the ruboff and smear tests, but the film was somewhat weak.

EXAMPLE 4

A coating composition consisting of 100 parts of hydroxy endblocked polydimethylsiloxane having a viscosity of $5.0 \times 10^{-3}$ m²/second and 1.52 parts of benzophenone was applied to paper as in Example 1 and cured by the procedure of Example 1, with an exposure time of 20 seconds. No smear, no ruboff, and no migration were noted upon evaluation. The release value from the SBR adhesive was found to be 20 N/m (53 g/in). Release testing similarly performed with GMS263 acrylic adhesive, a product of the Monsanto Co. of St. Louis, MO, coated upon the cured release coating of the present example by the same procedure followed for the SBR adhesive resulted in tearing the paper coated with the cured release coating of the present example upon testing, which indicates a high value of release from the acrylic adhesive used.

EXAMPLE 5

A coating composition consisting of 100 parts of trimethylsiloxy endblocked polyethylmethylsiloxane having a viscosity of $5.1 \times 10^{-4}$ m$^2$/second and 1.5 parts of benzophenone was applied to paper and exposed to UV radiation for 20 seconds by the procedure of Example 1. No smear, slight ruboff, and slight migration were noted. Release testing similarly performed with the acrylic adhesive of Example 4 resulted in tearing the coated paper.

EXAMPLE 6

A coating composition consisting of 9.55 g (100 parts) of hydroxy endblocked polydimethylsiloxane having a viscosity of $6.0 \times 10^{-3}$ m$^2$/second, 0.30 g, (3.1 parts), of cyclopolymethylvinylsiloxane, and 0.15 g (1.6 parts) of benzophenone was applied to paper and exposed to UV radiation by the procedure of Example 1. No ruboff, no smear, and no migration were noted.

EXAMPLE 7

A coating composition consisting of 5 g, (100 parts) of Me$_3$SiO(MeCH$_3$CH$_2$SiO)$_2$(Me$_2$SiO)$_{240}$SiMe$_3$, 8 g (160 parts) of Me$_2$ViSiO(MeViSiO)$_2$(Me$_2$SiO)$_{180}$SiViMe$_2$, 0.05 g (1 part), of benzophenone and 0.05 g (1 part), of benzoin ethyl ether was made and cast onto a substrate as a 1 mm thick film. This cast film was exposed to a 16 kW/m, high pressure mercury vapor ultravoilet lamp at a distance from said lamp of 6 cm for 10 seconds. The resulting cured film was found to be rubbery upon examination.

EXAMPLE 8

A coating composition consisting of 5 g. (100 parts), of Me$_3$SiO(MeCH$_3$CH$_2$CH$_2$SiO)$_2$(Me$_2$SiO)$_{280}$SiMe$_3$, 5 g, (100 parts), of Me$_2$ViSiO(MeViSiO)$_2$(Me$_2$SiO)$_{18}$-OSiViMe$_2$, and 0.05 g, (1 part), of benzophenone was cast and exposed by the procedure of Example 7. The subsequent cured film was found to be rubbery.

Comparison Experiments

The following experiments were conducted to determine the limits of this invention and are included herein for comparison.

The polymer of Example 1, with no admixed UV radiation photosensitizer, was applied to paper and exposed for 20 seconds by the procedure of Example 1. The applied film did not cure. Smear and migration were extreme.

A coating composition consisting of 100 parts of trimethylsiloxy endblocked polydimethylsiloxane having a viscosity of $5.0 \times 10^{-3}$ m$^2$/second, and 1.5 parts of benzophenone was applied to paper and exposed for 20 seconds by the procedure of Example 1. Smear, ruboff, and migration were noted.

The application and exposure procedure described in Example 1 was followed with each of the following mixtures:
1. 100 parts α,ω-bis(trimethylsiloxy)polyphenylmethylsiloxane having a viscosity of $8.7 \times 10^{-3}$ m$^2$/second, and 1.5 parts benzophenone;
2. 100 parts α,ω-bis(trimethylsiloxy)polybutylmethylsiloxane having a viscosity of $5.0 \times 10^{-4}$ m$^2$/second, and 1.5 parts benzophenone;
3. 100 parts α,ω-bis(trimethylsiloxy)poly-3,3,3-trifluoropropylmethylsiloxane having a viscosity of $8.7 \times 10^{-3}$ m$^2$/second, and 1.5 parts benzophenone;

None of the mixtures in the above comparison experiments showed evidence of cure after 20 seconds of exposure by the procedure of Example 1. All of the above comparison experiments exhibited smear and migration.

That which is claimed is:
1. A method for coating a substrate with a polydiorganosiloxane to provide a coating upon said substrate, said method comprising
   (A) applying to said substrate a coating composition consisting essentially of
     (1) 100 parts by weight of polydiorganosiloxane having a viscosity of from about $1.0 \times 10^{-4}$ m$^2$/second to about $1.0 \times 10^{-2}$ m$^2$/second, said polydiorganosiloxane being selected from the group consisting of polydiorganosiloxanes having the formula R$_3$SiO(MeQSiO)$_x$(Me$_2$SiO)$_y$SiR$_3$, wherein Q is a radical selected from the group consisting of ethyl and propyl radicals, R is a radical selected from the group consisting of Q radicals, methyl radicals, and hydroxyl radicals, Me represents the methyl radical, x has an average value of 0 or more, and y has an average value of 0 or more, there being at least two radicals selected from Q radicals and hydroxyl radicals in the polydiorganosiloxane, and
     (2) 0.1 to 10 parts by weight of an ultraviolet radiation photosensitizer soluble in said polydiorganosiloxane, and
   (B) exposing the applied coating composition to an amount of ultraviolet radiation sufficient to cure said applied coating composition.
2. The method of claim 1 wherein the polydiorganosiloxane is hydroxy endblocked polydimethylsiloxane.
3. The method of claim 2 wherein the coating composition contains, additionally, 0.1 to 250 parts by weight of an organosiloxane containing one or more silicon-bonded vinyl radical.
4. The method of claim 1 wherein Q denotes the ethyl radical, and wherein the polydiorganosiloxane contains at least two ethyl radicals.
5. The method of claim 4 wherein the coating composition contains, additionally, 0.1 to 250 parts by weight of an organosiloxane containing one or more silicon-bonded vinyl radicals.
6. The method of claim 1 wherein Q denotes the propyl radical, and wherein the polydiorganosiloxane contains at least two propyl radicals.
7. The method of claim 6 wherein the coating composition contains, additionally, 0.1 to 250 parts by weight of an organosiloxane containing one or more silicon-bonded vinyl radical.
8. The method of claim 1 wherein the substrate is paper.
9. The method of claim 2 wherein the substrate is paper.

10. The method of claim 3 wherein he substrate is paper.

11. The method of claim 4 wherein the substrate is paper.

12. The method of claim 5 wherein the substrate is paper.

13. The method of claim 6 wherein the substrate is paper.

14. The method of claim 7 wherein the substrate is paper.

15. Coated paper obtained by the method of claim 8.

16. Coated paper obtained by the method of claim 9.

17. Coated paper obtained by the method of claim 11.

18. Coated paper obtained by the method of claim 13.

19. The method of claim 1 wherein the substrate is a polymeric film.

20. The method of claim 2 wherein the substrate is a polymeric film.

21. The method of claim 3 wherein the substrate is a polymeric film.

22. The method of claim 4 wherein the substrate is a polymeric film.

23. The method of claim 5 wherein the substrate is a polymeric film.

24. The method of claim 6 wherein the substrate is a polymeric film.

25. The method of claim 7 wherein the substrate is a polymeric film.

26. A coated polymeric film obtained by the method of claim 19.

27. A coated polymeric film obtained by the method of claim 20.

28. A coated polymeric film obtained by the method of claim 22.

29. A coated polymeric film obtained by the method of claim 24.

* * * * *